US011706676B2

(12) United States Patent
Akl et al.

(10) Patent No.: US 11,706,676 B2
(45) Date of Patent: Jul. 18, 2023

(54) POWER-SAVING MODE BASED SELECTION OF A TARGET NODE

(71) Applicant: QUALCOMM Incorporated, San Diego, CA (US)

(72) Inventors: Naeem Akl, Somerville, NJ (US); Navid Abedini, Somerset, NJ (US); Junyi Li, Chester, NJ (US); Jianghong Luo, Skillman, NJ (US); Luca Blessent, Whitehouse Station, NJ (US); Karl Georg Hampel, Hoboken, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 16/905,280

(22) Filed: Jun. 18, 2020

(65) Prior Publication Data

US 2021/0400545 A1 Dec. 23, 2021

(51) Int. Cl.
*H04W 36/00* (2009.01)
*H04L 5/00* (2006.01)
*H04W 16/28* (2009.01)
*H04W 36/16* (2009.01)
*H04W 52/02* (2009.01)

(52) U.S. Cl.
CPC ....... *H04W 36/0088* (2013.01); *H04L 5/0007* (2013.01); *H04L 5/0048* (2013.01); *H04W 16/28* (2013.01); *H04W 36/0058* (2018.08); *H04W 36/00835* (2018.08); *H04W 36/16* (2013.01); *H04W 52/0203* (2013.01)

(58) Field of Classification Search
CPC ......... H04W 36/0088; H04W 36/0058; H04W 36/00835; H04W 36/16; H04W 16/28; H04W 52/0203; H04W 52/0206; H04W 24/10; H04L 5/0007; H04L 5/0048; Y02D 30/70
See application file for complete search history.

(56) References Cited

U.S. PATENT DOCUMENTS

2015/0118968 A1* 4/2015 Nory ............... H04W 36/00835
455/67.11

FOREIGN PATENT DOCUMENTS

EP 2747493 A1 * 6/2014 ........ H04W 28/0205
EP 2928225 A1 10/2015
(Continued)

OTHER PUBLICATIONS

International Search Report and Written Opinion—PCT/US2021/033890—ISA/EPO—dated Dec. 7, 2021.

*Primary Examiner* — Ricardo H Castaneyra
(74) *Attorney, Agent, or Firm* — Harrity & Harrity LLP/Qualcomm Incorporated

(57) ABSTRACT

Various aspects of the present disclosure generally relate to wireless communication. In some aspects, a wireless node may receive an indication of a plurality of sets of reference signal identifiers, wherein each set of reference signal identifiers of the plurality of sets of reference signal identifiers identifies reference signals of candidate neighbor nodes associated with the set, and wherein each candidate neighbor node associated with the set is in a same operating mode, and transmit a measurement report based at least in part on measuring one or more reference signals identified in the plurality of sets of reference signal identifiers. Numerous other aspects are provided.

53 Claims, 11 Drawing Sheets

(56) References Cited

FOREIGN PATENT DOCUMENTS

| WO | 2011085238 A2 | 7/2011 |
| WO | 2015063253 A1 | 5/2015 |

\* cited by examiner

POWER-SAVING MODE BASED SELECTION OF A TARGET NODE

FIELD OF THE DISCLOSURE

Aspects of the present disclosure generally relate to wireless communication and to techniques and apparatuses for power-saving mode based selection of a target node.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a child node, may include receiving an indication of a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode; and transmitting a measurement report based at least in part on measuring one or more reference signals identified in the plurality of sets of reference signal identifiers.

In some aspects, a method of wireless communication, performed by a control node, may include transmitting, to a child node, a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode; receiving, from the child node, a measurement report based at least in part on the plurality of sets of reference signal identifiers; and performing an action based at least in part on receiving the measurement report.

In some aspects, a method of wireless communication, performed by a neighbor node, may include transmitting, in an operating mode, reference signals according to a schedule associated with the operating mode; receiving, from a control node, an indication of an action performed by the control node; and modifying the operating mode of the neighbor node based at least in part on receiving the indication from the control node.

In some aspects, a wireless node for wireless communication may include a memory and one or more processors operatively coupled to the memory. The memory and the one or more processors may be configured to receive an indication of a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode; and transmit a measurement report based at least in part on measuring one or more reference signals identified in the plurality of sets of reference signal identifiers.

In some aspects, a control node for wireless communication may include a memory and one or more processors operatively coupled to the memory. The memory and the one or more processors may be configured to transmit, to a child node, a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode; receive, from the child node, a measurement report based at least in part on the plurality of sets of reference signal identifiers; and perform an action based at least in part on receiving the measurement report.

In some aspects, a neighbor node for wireless communication may include a memory and one or more processors operatively coupled to the memory. The memory and the one or more processors may be configured to transmit, in an operating mode, reference signals according to a schedule associated with the operating mode; receive, from a control node, an indication of an action performed by the control node; and modify the operating mode of the neighbor node based at least in part on receiving the indication from the control node.

In some aspects, a non-transitory computer-readable medium may store one or more instructions for wireless communication. The one or more instructions, when executed by one or more processors of a child node, may cause the one or more processors to receive an indication of a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode; and transmit a measurement report based at least in part on measuring one or more reference signals identified in the plurality of sets of reference signal identifiers.

In some aspects, a non-transitory computer-readable medium may store one or more instructions for wireless communication. The one or more instructions, when executed by one or more processors of a control node, may cause the one or more processors to transmit, to a child node, a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode; receive, from the child node, a measurement report based at least in part on the plurality of sets of reference signal identifiers; and perform an action based at least in part on receiving the measurement report.

In some aspects, a non-transitory computer-readable medium may store one or more instructions for wireless communication. The one or more instructions, when executed by one or more processors of a neighbor node, may cause the one or more processors to transmit, in an operating mode, reference signals according to a schedule associated with the operating mode; receive, from a control node, an indication of an action performed by the control node; and modify the operating mode of the neighbor node based at least in part on receiving the indication from the control node.

In some aspects, an apparatus for wireless communication may include means for receiving an indication of a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode; and means for transmitting a measurement report based at least in part on measuring one or more reference signals identified in the plurality of sets of reference signal identifiers.

In some aspects, an apparatus for wireless communication may include means for transmitting, to a child node, a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode; means for receiving, from the child node, a measurement report based at least in part on the plurality of sets of reference signal identifiers; and means for performing an action based at least in part on receiving the measurement report.

In some aspects, an apparatus for wireless communication may include means for transmitting, in an operating mode, reference signals according to a schedule associated with the operating mode; means for receiving, from a control node, an indication of an action performed by the control node; and means for modifying the operating mode of the neighbor node based at least in part on receiving the indication from the control node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
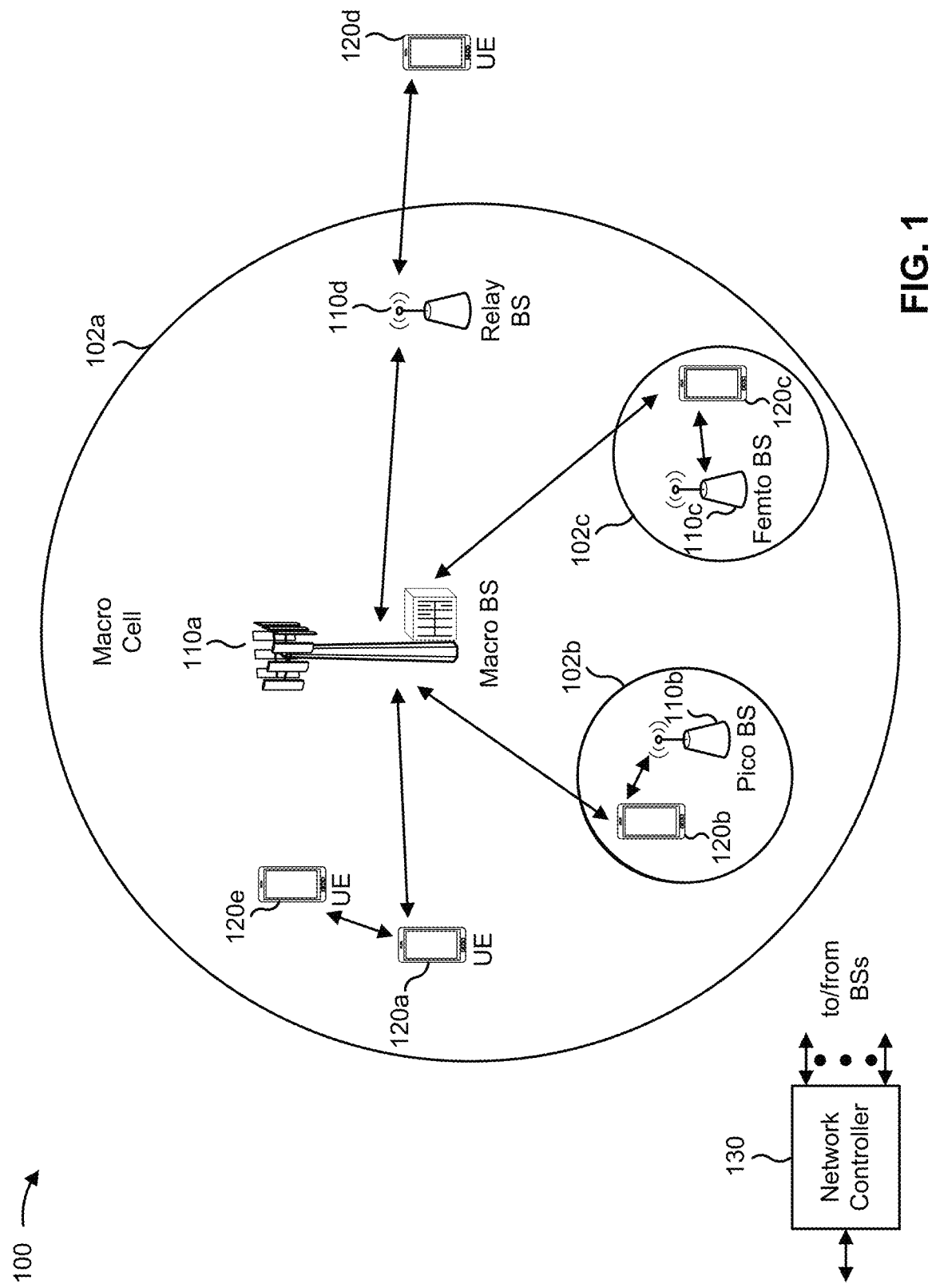
FIG. 1 is a diagram illustrating an example of a wireless network, in accordance with various aspects of the present disclosure.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
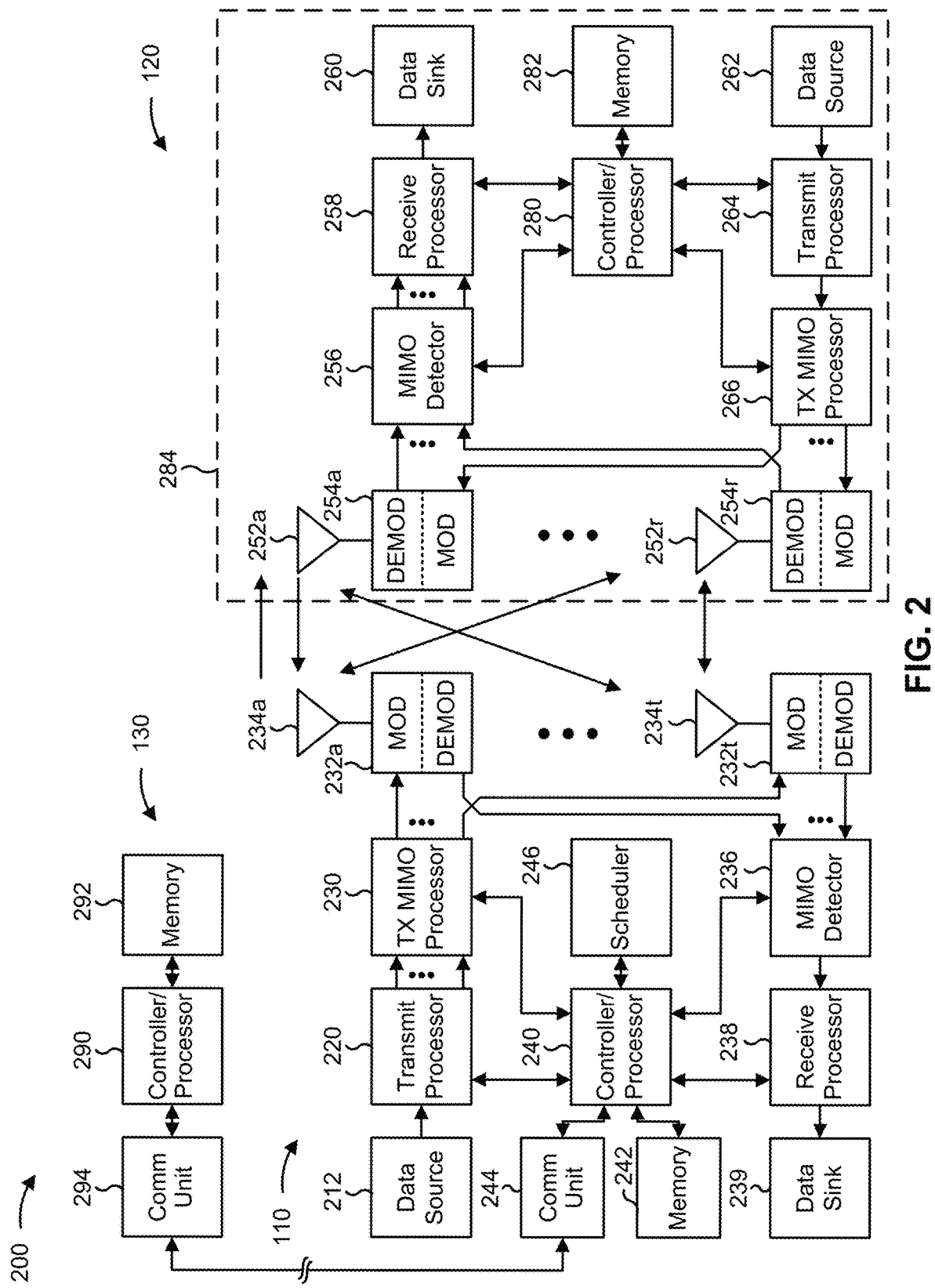
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-11.

Controller/processor 240 of base station 110, controller/processor 280 of UE 120, and/or any other component(s) of FIG. 2 may perform one or more techniques associated with power-saving mode based selection of a target node, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 900 of FIG. 9, process 1000 of FIG. 10, process 1100 of FIG. 11, and/or other processes as described herein. In some aspects, executing instructions may include running the instructions, converting the instructions, compiling the instructions, interpreting the instructions, and/or the like.

In some aspects, a child node (e.g., an IAB node, a UE 120, and/or the like) may include means for receiving an indication of a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode, means for transmitting a measurement report based at least in part on measuring one or more reference signals identified in the plurality of sets of reference signal identifiers, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a control node (e.g., an IAB donor, an IAB node, a base station 110, and/or the like) may include means for transmitting, to a child node, a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode, means for receiving, from the child node, a measurement report based at least in part on the plurality of sets of reference signal identifiers, means for performing an action based at least in part on receiving the measurement report, and/or the like. In some aspects, such means may include one or more components of base station 110 and/or network controller 130 (one or both of which may correspond to the control node) described in connection with FIG. 2, such as antenna 234, DEMOD 232, MIMO detector 236, receive processor 238, controller/processor 240, transmit processor 220, TX MIMO processor 230, MOD 232, antenna 234, controller/processor 290, memory 292, communication unit 294, and/or the like.

In some aspects, a neighbor node (e.g., an IAB node, a base station 110, and/or the like) may include means for transmitting, in an operating mode, reference signals according to a schedule associated with the operating mode, means for receiving, from a control node, an indication of an action performed by the control node, means for modifying the operating mode of the neighbor node based at least in part on receiving the indication from the control node, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
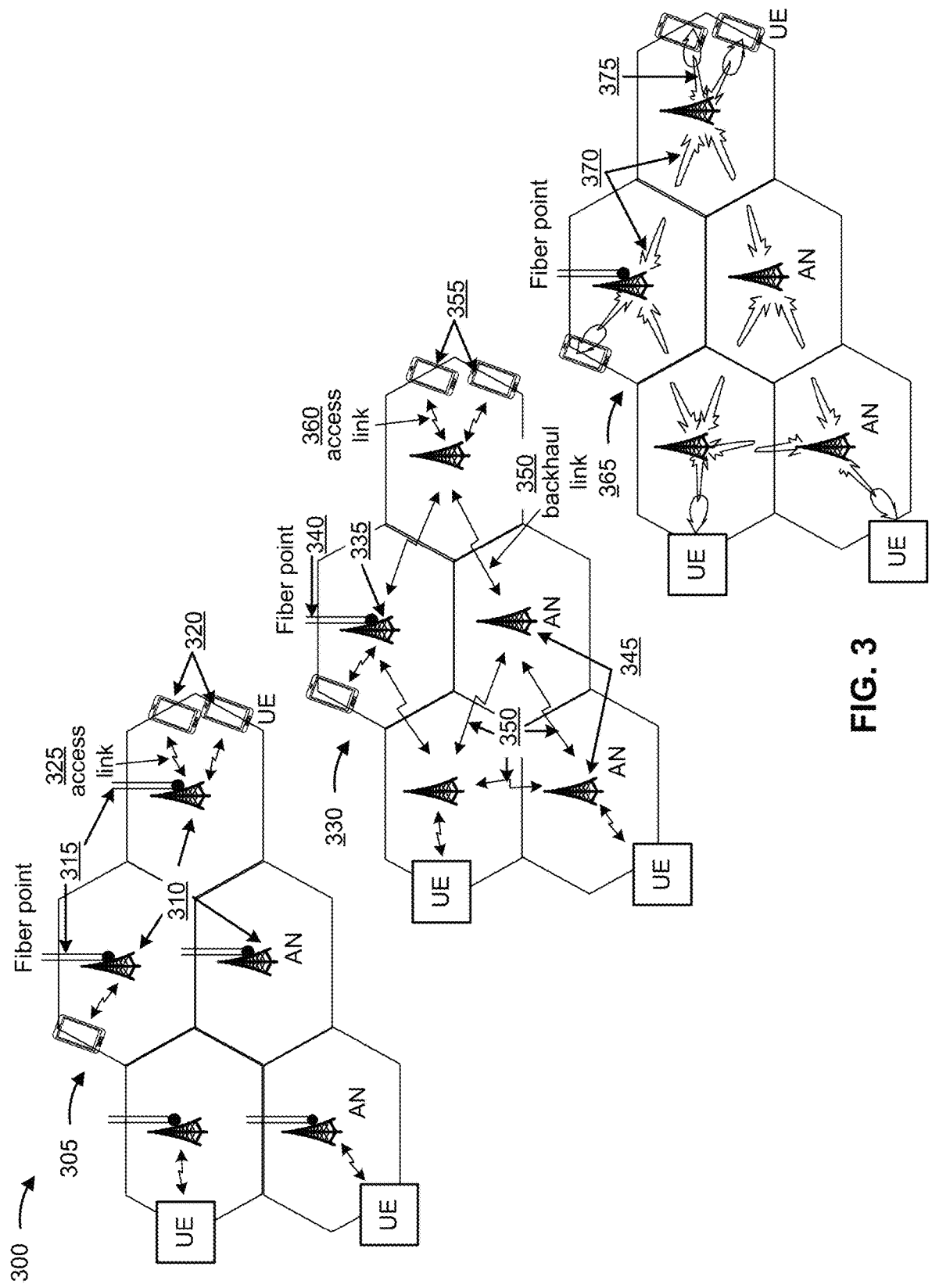
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, a UE that is directly in communication with a base station (e.g., an anchor base station or a non-anchor base station) may be referred to as an anchor node.

As indicated above, FIG. 3 is provided as an example. Other examples may differ from what is described with regard to FIG. 3.

Figure 4:
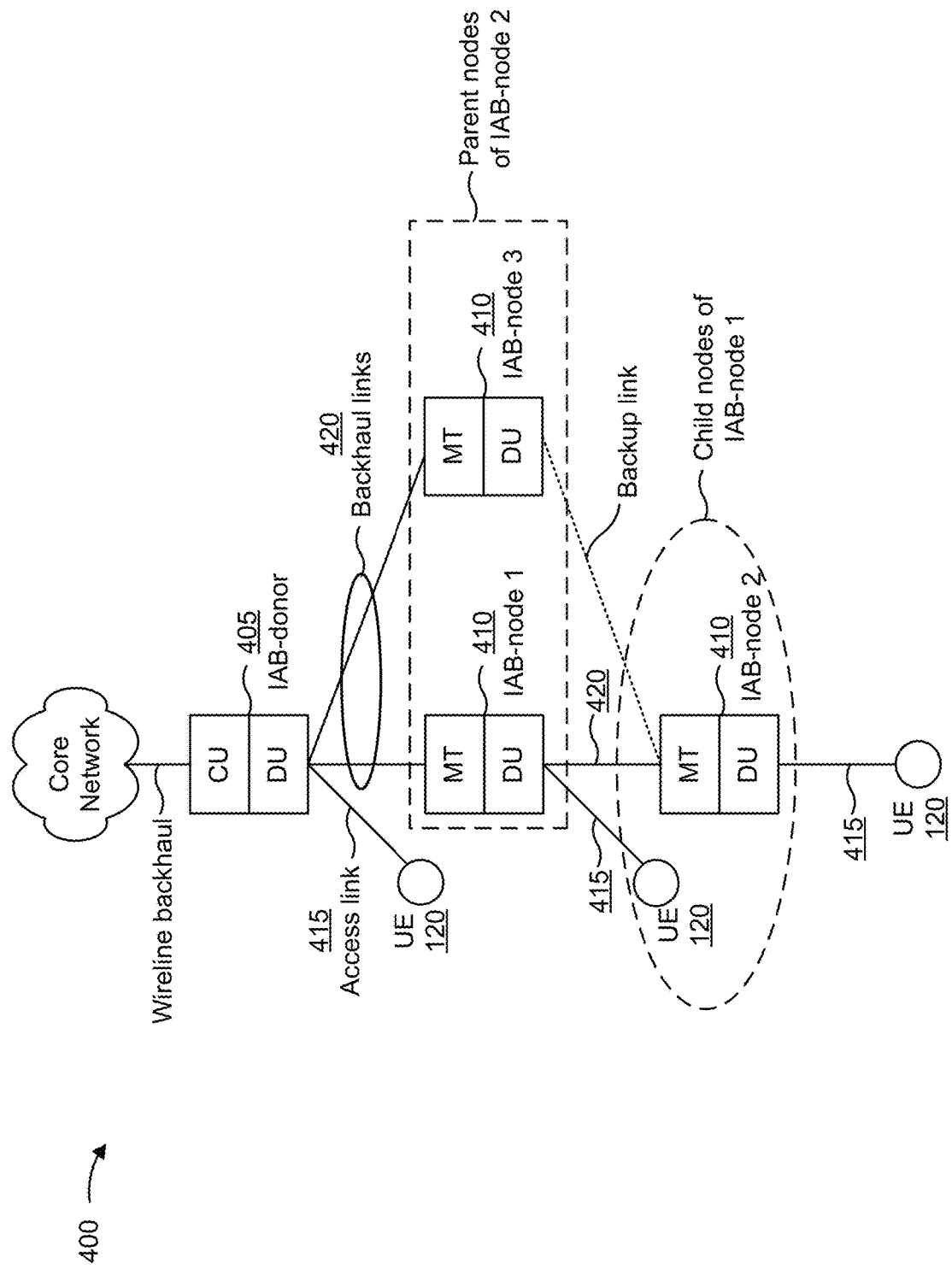
FIG. 4 is a diagram illustrating an example of an integrated access and backhaul (IAB) network architecture, in accordance with various aspects of the present disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (F1AP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, an IAB donor 405 or an IAB node 410 may be referred to as a node or a wireless node.

In an IAB network, network resources for wireless communications (e.g., time resources, frequency resources, spatial resources, and/or the like) may be shared between a parent link 425 of an IAB node 410 (shown as link 420/425 for IAB-node 1) and a child link 430 of the IAB node 410 (shown as link 420/430 for IAB-node 1). When an IAB node 410 uses time division multiplexing (TDM) between a parent link 425 and a child link 430, the IAB node 410 is subject to a half duplex constraint, meaning that the IAB node 410 cannot transmit and receive information at the same time (e.g., cannot concurrently communicate via a parent link 425 of the IAB node 410 and a child link 430 of the IAB node 410). This constraint may lead to high latency for communications.

To reduce latency, increase robustness, and expand coverage of an IAB network, the IAB network may be over-deployed. For example, there may be multiple IAB donors 405 and/or IAB nodes 410 with overlapping coverage, there may be multiple routes from a particular UE 120 and/or IAB node 410 to another IAB node and/or to the IAB donor 405, and/or the like. For example, because millimeter wave communications have high signal attenuation during propagation, IAB nodes 410 with overlapping coverage may be deployed to expand coverage in the IAB network and mitigate such signal attenuation. Furthermore, because millimeter wave communications are susceptible to link blockage and link failure, IAB nodes 410 with overlapping coverage may be deployed to improve robustness of the IAB network.

In an over-deployed IAB network, different IAB nodes 410 may have different operating modes depending on, for example, a number of child nodes and/or UEs 120 served by the IAB node 410, an amount of traffic served by the IAB node 410, a power status of the IAB node 410 (e.g., whether the IAB node 410 is operating using battery power or alternating current (AC) power, a remaining battery life of the IAB node 410, and/or the like), a power saving mode of the IAB node 410, and/or the like. To conserve energy and battery power, an IAB node 410 may enter an operating mode with low energy consumption when network activity (e.g., a number of child nodes and/or UEs 120 to be served, an amount of network traffic, and/or the like) in a coverage area of the IAB node 410 is low and/or if other IAB nodes 410 in that coverage area are capable of handling the network activity. Conversely, if network activity in a coverage area of an IAB node 410 is high and/or if other IAB nodes 410 in that coverage area are not capable of handling the network activity (or are not present in the coverage area), then the IAB node 410 may enter an operating mode with high energy consumption.

During a handover procedure, a UE 120 and/or a child node may be handed over from a serving node (e.g., a first parent node) to a target node (e.g., a second parent node). During a cell selection procedure and/or a cell reselection procedure, a UE 120 and/or a child node may select a target node to serve the UE 120 (e.g., as a serving node). In an over-deployed IAB network, there may be multiple neighbor nodes that satisfy one or more handover conditions (e.g., criteria) and/or a cell selection condition, and that are candidates for the target node. However, the multiple neighbor nodes may have different operating modes, such that selection of a first neighbor node over a second neighbor node provides poorer performance even if the first neighbor node is associated with better parameters (e.g., an RSRP parameter and/or the like) for handover or cell selection as compared to the second neighbor node. For example, the first neighbor node may be in a power saving mode, may be operating using battery power, may have low remaining battery life, may have a long route to an IAB donor 405, and/or the like. In this case, selection of the first neighbor node using traditional procedures and/or parameters for handover or cell selection would result in worse performance than selection of the second neighbor node. Some techniques and apparatuses described herein account for operating modes of neighbor nodes when performing a handover procedure and/or a cell selection procedure (e.g., including a cell reselection procedure), thereby improving performance of the IAB network.

As indicated above, FIG. 4 is provided as an example. Other examples may differ from what is described with regard to FIG. 4.

Figure 5:
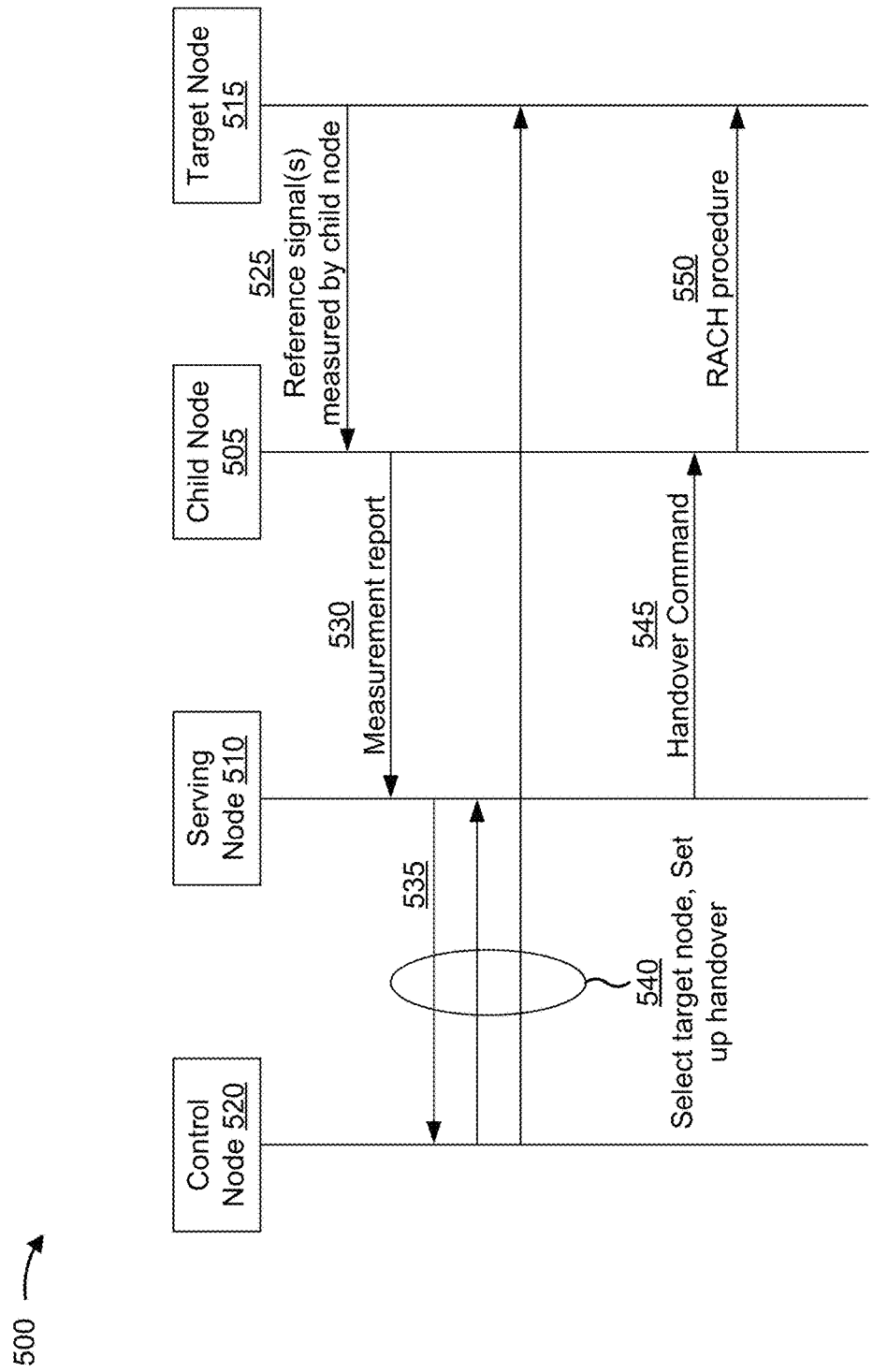
FIG. 5 is a diagram illustrating an example of a handover procedure in an IAB network, in accordance with various aspects of the present disclosure.

FIG. 5 is a diagram illustrating an example 500 of a handover procedure in an IAB network, in accordance with various aspects of the present disclosure.

As shown in FIG. 5, a handover procedure in an IAB network may involve a child node 505 (e.g., a UE, an MT of an IAB node, and/or the like), a serving node 510 that serves the child node 505 prior to handover, a target node 515 (e.g., selected from a set of neighbor nodes) that serves the child node 505 after handover, and a control node 520. The control node 520 may communicate with the serving node 510 and the target node 515 to initiate, set up, and/or otherwise assist in or instruct on the handover procedure. In some aspects, the control node 520 may be the same as the serving node 510 (e.g., operations described herein as being performed by the control node 520 may be performed by the serving node 510). In some aspects, the control node 520 may be a parent node of the serving node 510 and/or a parent node of the target node 515. In some aspects, the control node 520 may be an IAB donor 405 (e.g., a CU of an IAB donor 405).

As shown by reference number 525, the child node 505 may receive one or more reference signals from a set of neighbor nodes including the target node 515. The one or more reference signals may include, for example, one or more synchronization signal blocks (SSBs), one or more synchronization signal and/or physical broadcast channel (SS/PBCH) blocks, and/or the like. The child node 505 may perform measurements on the received reference signals, such as RSRP measurements, RSRQ measurements, RSSI measurements, signal-to-interference-plus-noise ratio (SINR) measurements, and/or the like.

As shown by reference number 530, the child node 505 may report the measurements of the reference signals of the set of neighbor nodes to the serving node 510, such as in a measurement report. As shown by reference number 535, the serving node 510 may provide the measurement report to the control node 520 responsible for selecting a target node, from the set of neighbor nodes, for handover. As shown by reference number 540, the control node 520 may select the target node 515 (e.g., if a handover condition is satisfied), and may communicate with the serving node 510 and the target node 515 to initiate, set up, and/or otherwise assist in or instruct on the handover procedure.

As shown by reference number 545, the serving node 510 may transmit a handover command to the child node 505. The handover command may indicate the target node 515 to which the child node 505 is to be handed over (e.g., as instructed by the control node 520 to the serving node 510). As shown by reference number 550, the child node 505 may perform a random access channel (RACH) procedure to connect to the target node 515 based at least in part on receiving the handover command that identifies the target node 515. After the handover procedure is complete, the child node 505 may be served by the target node 515 and not the serving node 510.

As indicated above, FIG. 5 is provided as an example. Other examples may differ from what is described with regard to FIG. 5.

Figure 6:
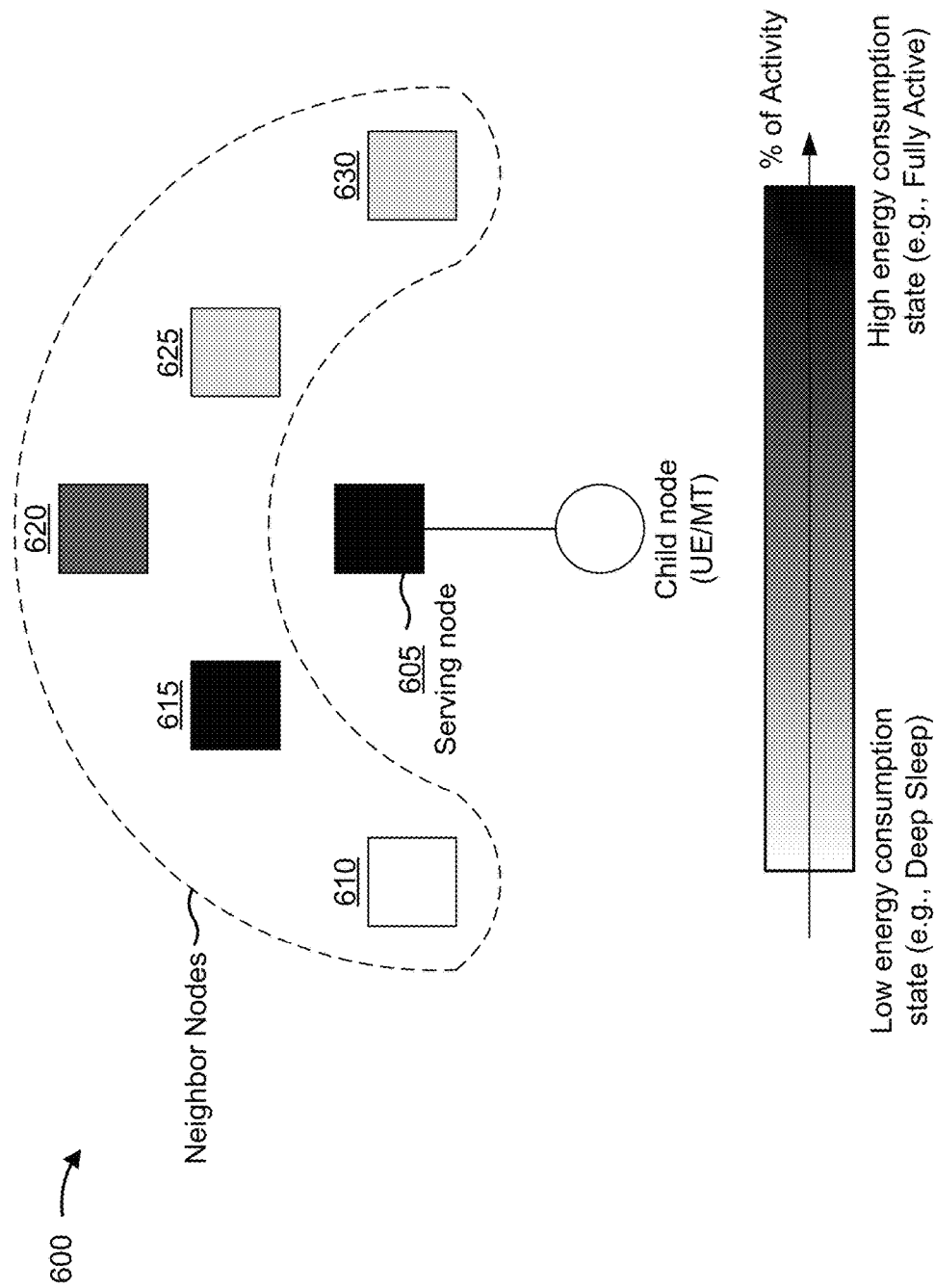
FIG. 6 is a diagram illustrating an example of various operating modes of nodes in an IAB network, in accordance with various aspects of the present disclosure.

FIG. 6 is a diagram illustrating an example 600 of various operating modes of nodes in an IAB network, in accordance with various aspects of the present disclosure.

As shown in FIG. 6, different nodes (e.g., IAB nodes 410) in an IAB network may operate in different operating modes (e.g., at a given point in time). For example, a serving node 605 of a child node (e.g., a UE/MT) may operate in a high energy consumption state (e.g., an active mode). The serving node 605 may operate in the high energy consumption state due to serving a quantity of child nodes that satisfies a threshold, due to serving an amount of network traffic that satisfies a threshold, due to being powered by AC power, due to having a remaining amount of battery life that satisfies a threshold, and/or the like. In the high energy consumption state, the serving node 605 may be fully active, may have more features enabled than a node in a lower energy consumption state, may perform one or more operations (e.g., transmissions, reference signal transmissions, paging, and/or the like) more frequently than a node in a lower energy consumption state, and/or the like.

As another example, a first neighbor node 610 may operate in a low energy consumption state (e.g., a dormant mode or a deep sleep mode). The first neighbor node 610 may operate in the low energy consumption state due to serving a number of child nodes that does not satisfy a threshold, due to serving an amount of network traffic that does not satisfy a threshold, due to being powered by battery power, due to having a remaining amount of battery life that does not satisfy a threshold, and/or the like. In the low energy consumption state, the first neighbor node 610 may be in a deep sleep mode and/or a power saving mode, may have fewer features enabled than a node in a higher energy consumption state, may perform one or more operations (e.g., transmissions, reference signal transmissions, paging, and/or the like) less frequently than a node in a higher energy consumption state, may operate with limited service (e.g., may provide only emergency service), and/or the like. In some aspects, in the low energy consumption state, the first neighbor node 610 may be powered off (e.g., for battery charging).

As further shown in FIG. 6, different neighbor nodes 615, 620, 625, and 630 may operate in different operating modes within a range of operating modes. For example, different operating modes may correspond to serving different numbers of child nodes (e.g., a number of child nodes that falls within a threshold range, that is greater than a threshold, that is less than a threshold, and/or the like), due to serving different amounts of network traffic (e.g., an amount of network traffic that falls within a threshold range, that is greater than a threshold, that is less than a threshold, and/or the like), due to being powered by battery power or by AC power, due to having different amounts of remaining battery life (e.g., an amount of remaining battery life that falls within a threshold range, that is greater than a threshold, that is less than a threshold, and/or the like), due to being in a charging state or not being in a charging state, and/or the like. As described herein, the range of operating modes below the high energy consumption state (e.g., the range of operating modes below the active mode) may be collectively referred to as a power-saving mode.

In some scenarios, the child node 605 may be handed over from the serving node 610 to one of the neighbor nodes, such as due to mobility of the child node 605 and/or the serving node 610, due to poor link quality between the child node 605 and the serving node 610, due to activation of a power-saving mode by the serving node 610, and/or the like. However, as described above, different neighbor nodes may have different operating modes. In this case, selection of a first neighbor node (e.g., neighbor node 610) over a second neighbor node (e.g., neighbor node 615) may provide poorer performance even if the first neighbor node is associated with better parameters (e.g., an RSRP parameter and/or the like) for handover as compared to the second neighbor node. In this case, selection of the first neighbor node using traditional procedures and/or parameters for handover or cell selection would result in worse performance than selection of the second neighbor node. Some techniques and apparatuses described herein account for operating modes of neighbor nodes when performing a handover procedure, thereby improving performance of the IAB network. Similarly, some techniques and apparatuses described herein account for operating modes of neighbor nodes when performing a cell selection procedure (e.g., including a cell reselection procedure), thereby improving performance of the IAB network.

As indicated above, FIG. 6 is provided as an example. Other examples may differ from what is described with regard to FIG. 6.

Figure 7:
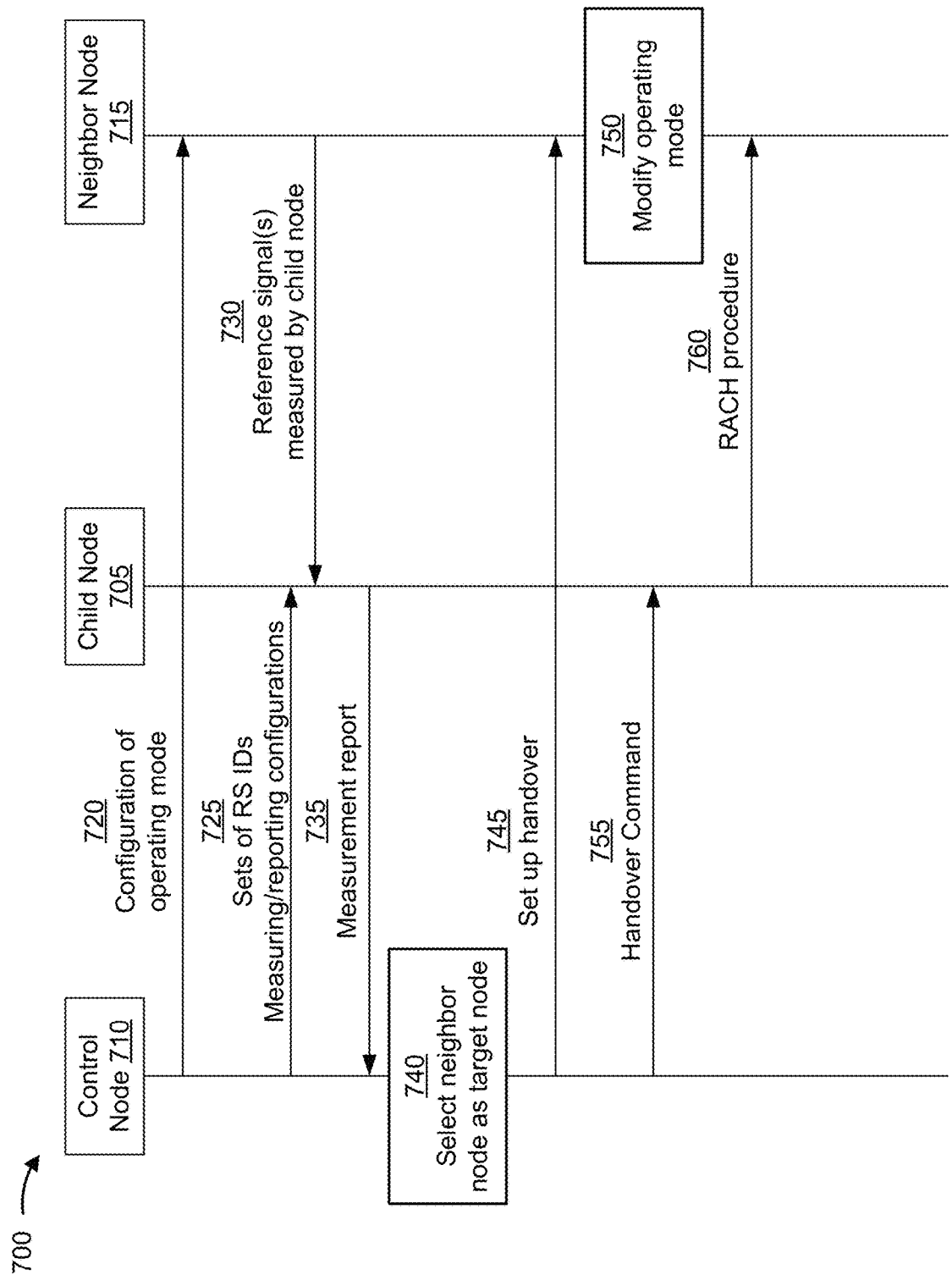
FIGS. 7-8 are diagrams illustrating examples associated with power-saving mode based selection of a target node, in accordance with various aspects of the present disclosure.

FIG. 7 is a diagram illustrating an example 700 associated with power-saving mode based selection of a target node, in accordance with various aspects of the present disclosure.

As shown in FIG. 7, a handover procedure in an IAB network may involve a child node 705 (e.g., a UE 120, an MT of an IAB node, and/or the like) communicating with a control node 710. The child node may be in a connected mode (e.g., a radio resource control (RRC) connected mode). The child node may be served by a serving node (e.g., a parent node, not shown). The child node 705 may receive reference signals (e.g., SSBs, channel state information reference signals (CSI-RSs), and/or the like) from one or more neighbor nodes, such as neighbor node 715. The child node 705 and/or the neighbor node 715 may be controlled by the control node 710. In some aspects, the child node 705 may be controlled by the control node 710, and the neighbor node 715 may be controlled by a different control node. In that case, the control node 710 may communicate with the different control node to cause the different control node to control the neighbor node 715 as instructed by the control node 710.

The nodes of FIG. 7 may correspond to nodes of the same name described above in connection with FIG. 5. Thus, as described above in connection with FIG. 5, the child node 705 may include a UE, an MT of an IAB node, and/or the like. The control node 710 may be a serving node (e.g., operations described herein as being performed by the control node 710 may be performed by a serving node (e.g., serving node 510)), may be a parent node of a serving node of the child node 705 (and/or of the neighbor node 715), and/or may be an IAB donor 405 (e.g., a CU of an IAB donor 405). In some aspects, the control node 710 may be an IAB node that is connected to the child node 705, a serving node of child node 705, and/or the neighbor node 715.

As shown by reference number 720, the control node 710 may configure an operating mode of the neighbor node 715 and/or one or more other neighbor nodes. The operating modes may correspond to the operating modes described above in connection with FIG. 6. For example, the control node may configure the neighbor node 715 to operate in an active mode (e.g., a fully active mode) or in a power-saving mode (e.g., an operating mode with less energy consumption than the fully active mode, as described above in connection with FIG. 6).

In some aspects, the control node 710 may configure the operating mode of the neighbor node 715 based at least in part on information associated with the child node 705 (e.g., a location of the child node 705, a trajectory of the child node 705, and/or the like). In some aspects, the control node 710 may configure the operating node of the neighbor node 715 based at least in part on a deployment of one or more child nodes (e.g., one or more UEs 120 and/or the like) in the IAB network. For example, the control node 710 may configure the neighbor node 715 to have an increased activity level (e.g., an operating mode with a higher level of energy consumption, an active operating mode, and/or the like) if the child node 705 (or one or more other child nodes) is located proximate to the neighbor node 715. In some aspects, the control node 710 may configure the neighbor node 715 to have a decreased activity level (e.g., an operating mode with a lower level of energy consumption, a deep sleep operating mode, a dormant operating mode, and/or the like) if no child nodes are located proximate to the neighbor node 715.

In some aspects, the control node 710 may configure the operating mode of the neighbor node 715 independent of information associated with the child node 705. For example, the control node 710 may configure the operating mode of the neighbor node 715 based at least in part on information associated with the IAB network (e.g., a traffic level of the IAB network, a load balance of the IAB network, and/or the like), information associated with the neighbor node 715 (e.g., a power state of the neighbor node 715 (e.g., a battery level state, a charging state, an AC power state, and/or the like), a traffic load of the neighbor node 715, and/or the like), and/or the like. For example, the control node 710 may configure the operating mode of the neighbor node 715 to have a decreased activity level if the neighbor node 715 has a low power level. In some aspects, the control node 710 may configure the operating mode of the neighbor node 715 to have an increased activity level if the neighbor node 715 is powered by AC power. As described above, the control node 710 may configure an operating mode for a plurality of neighbor nodes in a similar manner as described above in connection with the neighbor node 715.

In some aspects, the operating mode of the neighbor node 715 may indicate a transmission schedule associated with reference signals (e.g., SSBs, CSI-RSs, and/or the like) to be transmitted by the neighbor node 715. For example, the operating mode may indicate a repetition scheme or a periodicity associated with transmission of the reference signals. In some aspects, in a power-saving mode the schedule may indicate that the neighbor node is to transmit reference signals less frequently than indicated by a schedule associated with the active mode. In some aspects, the operating mode of the neighbor node 715 may indicate a transmit power associated with transmitting the reference signals, a beam sweep configuration, an availability of one or more functions that the neighbor node is capable of performing, and/or the like.

As shown by reference number 725, the control node 710 may transmit, to the child node 705, an indication of a plurality of sets of reference signal identifiers. A set of reference signal identifiers may identify reference signals of neighbor nodes associated with the set (e.g., the set may include one or more reference signal identifiers, and a reference signal identifier of the one or more reference signal identifiers may identify a reference signal of a neighbor node, such as neighbor node 715). Each neighbor node associated with a single set may be in a same operating mode. That is, the control node 710 may provide the child 705 with a list of reference signal identifiers for neighbor nodes in an active mode, a list of reference signal identifiers for neighbor nodes in a power-saving mode, and/or the like. A set of reference signal identifiers may be a physical cell identifier (PCI) list. That is, a set of reference signal identifiers may be a list identifying one or more neighbor nodes (e.g., that are in a same operating mode). In this way, the child node 705 may be made aware of which neighbor nodes are operating in an active mode and which neighbor nodes are operating in a power-saving mode.

In some aspects, the child node 705 may receive an active mode set of reference signal identifiers (e.g., associated with neighbor nodes in an active mode) and a power-saving mode set of reference signal identifiers (e.g., associated with neighbor nodes in a power-saving mode). In some aspects, the child node 705 may receive more than one power-saving mode set of reference signal identifiers (e.g., there may be a first power-saving mode set of reference signal identifiers (e.g., associated with one or more neighbor nodes in a medium energy consumption state), a second power-saving mode set of reference signal identifiers (e.g., associated with one or more neighbor nodes in a low energy consumption state), and/or the like).

In some aspects, the control node 710 may periodically update the plurality of sets of reference signal identifiers and/or periodically transmit the plurality of sets of reference signal identifiers. In some aspects, the control node 710 may update the plurality of sets of reference signal identifiers or transmit an updated plurality of sets of reference signal identifiers based at least in part on determining that one or more neighbor nodes has changed operating modes.

The control node 710 may transmit, to the child node 705, configurations associated with each set of reference signal identifiers. For example, a set of reference signal identifiers may be associated with a measurement configuration, a reporting configuration, and/or the like. The measurement configuration may indicate a schedule at which the child node 705 is to perform measurements (e.g., reference signal received power (RSRP) measurements, reference signal received quality (RSRQ) measurements, and/or the like) of reference signals identified in the set of reference signal identifiers, a beam sweep configuration for performing measurements of reference signals identified in the set of reference signal identifiers, and/or the like. The reporting configuration may indicate how or when the child node 705 is to report measurements (e.g., in a measurement report) to the control node 710 of reference signals identified in the set of reference signal identifiers.

In some aspects, a measurement configuration and/or a reporting configuration for a first set of reference signal identifiers may be based at least in part on information associated with reference signals identified in a second set of reference signal identifiers. For example, a reporting configuration for a power-saving mode set of reference signal identifiers may indicate that the child node 705 is to report a measurement value of a reference signal identified in the power-saving mode set of reference signal identifiers only if the measurement value exceeds measurement values for each measured reference signal associated with an active mode set of reference signal identifiers by a threshold amount (e.g., by a threshold amount in decibels). In some aspects, the reporting configuration for the power-saving mode set of reference signal identifiers may indicate that the child node 705 is to report a measurement value of a reference signal identified in the power-saving mode set of reference signal identifiers only if it exceeds the highest measurement value of measured reference signals identified in the active mode set of reference signal identifiers by the threshold amount. In this way, the child node 705 may be configured to report measurements associated with a neighbor node in a power-saving mode only if the neighbor node in the power-saving mode has the best signal. As a result, the child node 705 may report measurement values associated with reference signals of neighbor nodes in an active mode more frequently than measurement values associated with reference signals of neighbor nodes in a power-saving mode, resulting in improved performance of the IAB network.

The control node 710 may transmit, to the child node 705, an indication of a transmission schedule associated with reference signals to be transmitted by a neighbor node, such as the neighbor node 715. The indication of the transmission schedule may indicate a periodicity at which the neighbor node 715 is to transmit reference signals. The child node 705 may measure one or more reference signals associated with the neighbor node 715 based at least in part on receiving the indication of the transmission schedule for the neighbor node 715. This may enable the child node 705 to detect and measure the reference signals transmitted by the neighbor node 715 more efficiently.

As shown by reference number 730, the neighbor node 715 may transmit one or more reference signals to be measured by the child node 705. The neighbor node 715 may transmit the one or more reference signals based at least in part on the operating mode of the neighbor node 715. For example, the neighbor node 715 may transmit the one or more reference signals according to a transmission schedule associated with the operating mode. The child node 705 may receive a reference signal from the neighbor node 715. The child node 705 may identify the reference signal in a set of reference signal identifiers (e.g., of the plurality of sets of reference signal identifiers). The child node 705 may measure the reference signal according to a measurement configuration associated with the set of reference signal identifiers. Similarly, the child node 705 may report the measurement (e.g., in a measurement report) according to a reporting configuration associated with the set of reference signal identifiers.

As shown by reference number 735, the child node 705 may transmit a measurement report to the control node 710. The measurement report may indicate one or more measurement values of reference signals measured by the child node 705. The measurement report may indicate a neighbor node associated with each measurement value. In some aspects, the measurement report may indicate a set of reference signal identifiers associated with a measurement value included in the measurement report. In some aspects, the measurement report may indicate an operating mode of a neighbor node associated with a measurement value included in the measurement report.

As shown by reference number 740, the control node 710 may select a neighbor node, such as neighbor node 715, as a target node for a handover procedure based at least in part on receiving the measurement report. The control node 710 may select the neighbor node 715 as the target node based at least in part on selection criteria being satisfied. The selection criteria may be based at least in part on information associated with the child node 705, information associated with the neighbor node 715, the measurement received by the control node 710, information associated with one or more other neighbor nodes, and/or the like.

The information associated with the child node 705 may include a location of the child node 705, a trajectory of the child node 705, a service level (e.g., a quality of service, a level of signal-to-noise ratio (SNR) required by a service, and/or the like) requested by the child node, and/or the like. For example, the control node 710 may select the neighbor node 715 as the target node based at least in part on the child node 705 being located proximate to the neighbor node 715. In some aspects, if a service requested by the child node 705 requires a high SNR, the control node 710 may select the neighbor node 715 based at least in part on the child node 705 being located proximate to the neighbor node 715. Similarly, if a service requested by the child node 705 does not require a high SNR, the control node 705 may select neighbor nodes located further from the child node 705 as the target node.

The information associated with the neighbor node 715 may include a current operating mode of the candidate neighbor node 715, an operating mode history of the candidate neighbor node 715 (e.g., indicating when the neighbor node 715 entered a current operating mode, previous operating modes, and/or the like), a power state of the candidate neighbor node 715 (e.g., indicating whether the neighbor node 715 is powered by AC power or battery power, a remaining amount of battery life of the node (e.g., if powered by battery power), whether a battery of the node is being charged, a rate at which the battery of the node is being charged, and/or the like), a cost parameter for selecting the candidate neighbor node 715, and/or the like.

The cost parameter for a node may indicate and/or may be determined based at least in part on an operating mode of the neighbor node 715. In some aspects, a higher cost may be associated with selecting a neighbor node in a low energy consumption state (e.g., a first power-saving mode) as compared to a medium energy consumption state (e.g., a second power-saving mode) because the neighbor node 715 may be required to exit an operating mode and/or serve a small number of child nodes (e.g., thereby causing inefficiencies). In some aspects, a higher cost may be associated with selecting a neighbor node in a high energy consumption state (e.g., an active mode) as compared to a medium energy consumption state (e.g., a power-saving mode) because the neighbor node 715 may become overloaded with traffic (e.g., thereby increasing latency, reducing reliability, and/or the like). Additionally, or alternatively, the cost parameter for a neighbor node may indicate and/or may be determined based at least in part on a hop count associated with the neighbor node. A hop count may indicate a number of hops (e.g., a number of links between nodes) from the neighbor node 715 to an IAB donor 405. In some aspects, a higher cost may be associated with selecting the neighbor node 715 that has a high hop count as compared to a low hop count because selecting the node with the high hop count may increase latency. In some aspects, the cost parameter may be based at least in part on operating modes of nodes included in a path from the neighbor node 715 to an IAB donor 405 (e.g., a higher cost may be associated with selecting the neighbor node 715 that includes nodes in power-saving modes in the path from the neighbor node 715 to an IAB donor 405 as the nodes in the power-saving mode may need to be transitioned to an active mode based at least in part on selecting the neighbor node 715).

As shown by reference number 745, the control node 710, based at least in part on selecting a target node for the handover procedure, may set up the handover. The control node 710 may instruct the target node (in example 700, the neighbor node 715) to perform the handover procedure. Based at least in part on the instruction, the neighbor node 715 may prepare for handover of the child node 705 from a serving node of the child node 705 to the neighbor node 715. In some aspects, after (or before) the child node 705 is handed over from the serving node to the neighbor node 705, the serving node 710 and/or the target node may modify respective operating modes. For example, as shown by reference number 750, the neighbor node 715 may modify an operating mode of the neighbor node 715 (e.g., the neighbor node 715 may transition from a power-saving operating mode to an active operating mode). Similarly, the serving node may transition from an active operating mode to a power-saving operating mode based at least in part on the child node 705 being handed over from the serving node to the neighbor node 715.

As shown by reference number 755, the control node 710 may transmit a handover command to the child node 705. The handover command may indicate the target node (e.g., neighbor node 715) to which the child node 705 is to be handed over. As shown by reference number 760, the child node 705 may perform a random access channel (RACH) procedure to connect to the neighbor node 715 based at least in part on receiving the handover command that identifies the neighbor node 715. After the handover procedure is complete, the child node 705 may be served by the neighbor node 715. In this way, the child node 705, and/or the control node 710 may account for operating modes of neighbor nodes when performing a handover procedure and/or a cell selection procedure (e.g., including a cell reselection procedure), thereby improving performance of the IAB network.

As indicated above, FIG. 7 is provided as an example. Other examples may differ from what is described with regard to FIG. 7.

Figure 8:
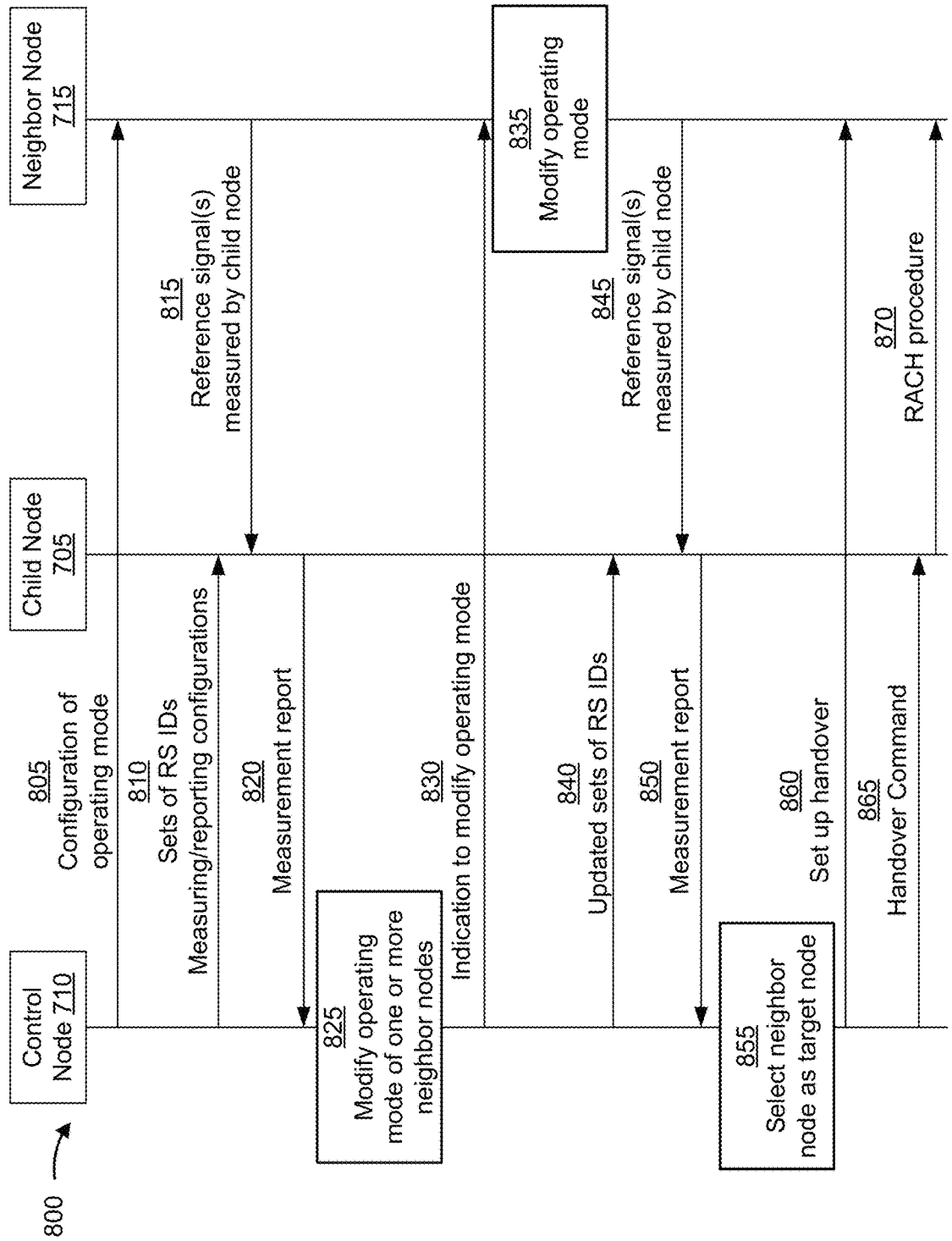

FIG. 8 is a diagram illustrating an example 800 associated with power-saving mode based selection of a target node, in accordance with various aspects of the present disclosure.

As shown in FIG. 8, a handover procedure in an IAB network may involve a child node 705 (e.g., a UE 120, an MT of an IAB node, and/or the like) communicating with a control node 710. The child node 705, the control node 710, and/or the neighbor node 715 of FIG. 8 may correspond to the nodes described above in connection with FIG. 7 (e.g., the nodes described herein in connection with FIG. 8 may perform similar (or the same) functions as the nodes described above in connection with FIG. 7).

The handover procedure may be configured and/or initiated in a similar manner as described above in connection with FIG. 7. For example, as shown by reference number 805, the control node 710 may configure operating modes for one or more neighbor nodes, such as neighbor node 715, in a similar manner as described above in connection with reference number 720 of FIG. 7. As shown by reference number 810, the control node 710 may provide, to the child node 705, a plurality of sets of reference signal identifiers and/or configurations associated with the sets of reference signal identifiers in a similar manner as described above in connection with reference number 725 of FIG. 7. As shown by reference number 815, the neighbor node 715 may transmit one or more reference signals to be measured by the child node 705 in a similar manner as described above in connection with reference number 730 of FIG. 7. As shown by reference number 820, the child node 705 may transmit, to the control node 710, a measurement report indicating measurement values of measured reference signals in a similar manner as described above in connection with reference number 735 of FIG. 7.

As shown by reference number 825, the control node 710 may determine to modify an operating mode of one or more neighbor nodes based at least in part on receiving the measurement report. That is, rather than selecting a target node after receiving the measurement report, the control node 710 may modify an operating mode of one or more neighbor nodes. The control node 710 may analyze the measurement report to identify neighbor nodes that should modify operating modes. For example, the control node 710 may identify a measurement in the measurement report associated with a neighbor node in a power-saving mode. The control node 710 may determine that the neighbor node should be transitioned to a more active operating mode (e.g., a higher energy consumption state, an active mode, and/or the like) based at least in part on a measurement from the neighbor node being included in the measurement report.

In some aspects, the control node 710 may determine that a neighbor node in an active mode (e.g., in a high energy consumption state) should be transitioned to a power-saving mode (e.g., transitioned to a lower energy consumption state) based at least in part on the measurement report. For example, the control node 710 may determine that the measurement report indicates a low measurement value (e.g., a low RSRP) associated with a reference signal transmitted by the neighbor node in the active mode. The control node 710 may determine that the neighbor node should be transitioned to a power-saving mode based at least in part on identifying the low measurement value. In some aspects, the control node 710 may determine a low measurement value based at least in part on the measurement value not satisfying a threshold value (e.g., a threshold RSRP). In some aspects, the control node 710 may determine that a neighbor node in an active mode should be transitioned to a power-saving mode based at least in part on determining that the measurement report does not include any measurements associated with the neighbor node in an active mode.

As shown by reference number 830, the control node 710 may transmit an indication to the neighbor node 715 indicating a new operating mode for the neighbor node 715. As shown by reference number 835, the neighbor node 715 may modify the operating mode of the neighbor node 715 based at least in part on receiving the indication from the control node 710. Modifying the operating mode of the neighbor node 715 may include modifying a periodicity (e.g., a rate at which repetitions of reference signals are transmitted) of a transmission schedule associated with transmitting reference signals, modifying a transmit power associated with transmitting the reference signals, modifying a beam sweep configuration of the neighbor node 715, modifying an availability of one or more functions that the neighbor node 715 is capable of performing, and/or the like.

For example, the indication from the control node 710 may indicate that the neighbor node 715 is to transition from a power-saving mode to an active mode. The neighbor node 715 may adjust the transmission schedule associated with transmitting reference signals to transmit the reference signals more frequently. Similarly, in some aspects, the neighbor node 715 may transmit the reference signals with a higher transmit power based at least in part on modifying the operating mode from a power-saving mode to an active mode. In some aspects, the indication from the control node 710 may indicate that the neighbor node 715 is to transition from an active mode to a power-saving mode. The neighbor node 715 may adjust the transmission schedule associated with transmitting reference signals to transmit the reference signals less frequently, with a lower transmission schedule, with a limited beam sweep configuration (e.g., transmitting reference signals in less than all possible directions), and/or the like.

As shown by reference number 840, the control node 710 may transmit, to the child node 705, updated sets of reference signal identifiers based at least in part on causing an operating mode of one or more neighbor nodes to be modified. For example, the control node 710 may cause the neighbor node 715 to transition from a power-saving mode to an active mode. In the original sets of reference signal identifiers (e.g., transmitted as described above in connection with reference number 810), a reference signal identifier of the neighbor node 715 may have been included in a set of reference signal identifiers associated with neighbor nodes in a power-saving mode. In the updated sets of reference signal identifiers, the reference signal identifier of the neighbor node 715 may be included in a set of reference signal identifiers associated with neighbor nodes in an active mode. As a result, the child node 705 may measure and report reference signals received from the neighbor node 715 according to different configurations (e.g., according to a measurement configuration and/or a reporting configuration associated with the set of reference signal identifiers associated with neighbor nodes in an active mode). This may enable improved evaluation of the neighbor node 715 for selection as a target node by the control node 710.

As shown by reference number 845, the neighbor node 715 may transmit reference signals according to the transmission schedule associated with the modified operating mode. The child node 705 may measure and report the received reference signals according to a measurement configuration and/or a reporting configuration associated with the modified operating mode (e.g., associated with a set of reference signal identifiers that identifies the reference signal received from the neighbor node 715).

As shown by reference number 850, the child node 705 may transmit a measurement report (e.g., a second measurement report) based at least in part on measuring the reference signal(s) received from the neighbor node 715 (and/or one or more other neighbor nodes). The measurement report may indicate measurements of reference signals received from neighbor nodes after one or more neighbor nodes have modified operating modes (e.g., as instructed by the control node 710).

In this way, the control node 710 may modify an operating mode of one or more neighbor nodes in order to re-assess the neighbor nodes for selection as a target node for the handover procedure. Modifying the operating mode of one or more neighbor nodes may initiate a second handover procedure cycle. A handover procedure cycle may include a first step of one or more neighbor nodes transmitting reference signals according to an operating mode of the neighbor nodes, a second step of the child node 705 measuring and/or reporting the reference signals, and a third step of the control node 710 evaluating the measurements to select a target node or modify an operating mode of one or more neighbor cells. The control node 710 may cause the handover procedure cycle to repeat one or more times until selection criteria for the handover procedure have been satisfied (e.g., criteria for selecting a neighbor node as the target node). As described above in connection with FIG. 7, the selection criteria may be based at least in part on information associated with the child node 705, information associated with the neighbor node 715, information included in a measurement report, and/or the like.

As shown by reference number 855, the control node 710 may select a neighbor node, such as neighbor node 715, as the target node for the handover procedure. The control node may determine a neighbor node to select as the target node in a similar manner as described above in connection with reference number 740 of FIG. 7. As shown by reference number 860, the control node 710 may set up the handover by transmitting an indication to the neighbor node 715 that the neighbor node 715 has been selected as the target node for a handover from a serving node of the child node 705 to the neighbor node 715. As shown by reference number 865, the control node 710 may transmit a handover command to the child node 705. The handover command may indicate the target node (e.g., neighbor node 715) to which the child node 705 is to be handed over. As shown by reference number 870, the child node 705 may perform a RACH procedure to connect to the neighbor node 715 based at least in part on receiving the handover command that identifies the neighbor node 715. After the handover procedure is complete, the child node 705 may be served by the neighbor node 715. In this way, the child node 705, and/or the control node 710 may account for operating modes of neighbor nodes when performing a handover procedure and/or a cell selection procedure (e.g., including a cell reselection procedure), thereby improving performance of the IAB network. Additionally, the control node 710 may modify operating modes of neighbor nodes while performing a handover procedure, thereby improving the efficiency of the handover procedure.

As indicated above, FIG. 8 is provided as an example. Other examples may differ from what is described with regard to FIG. 8.

Figure 9:
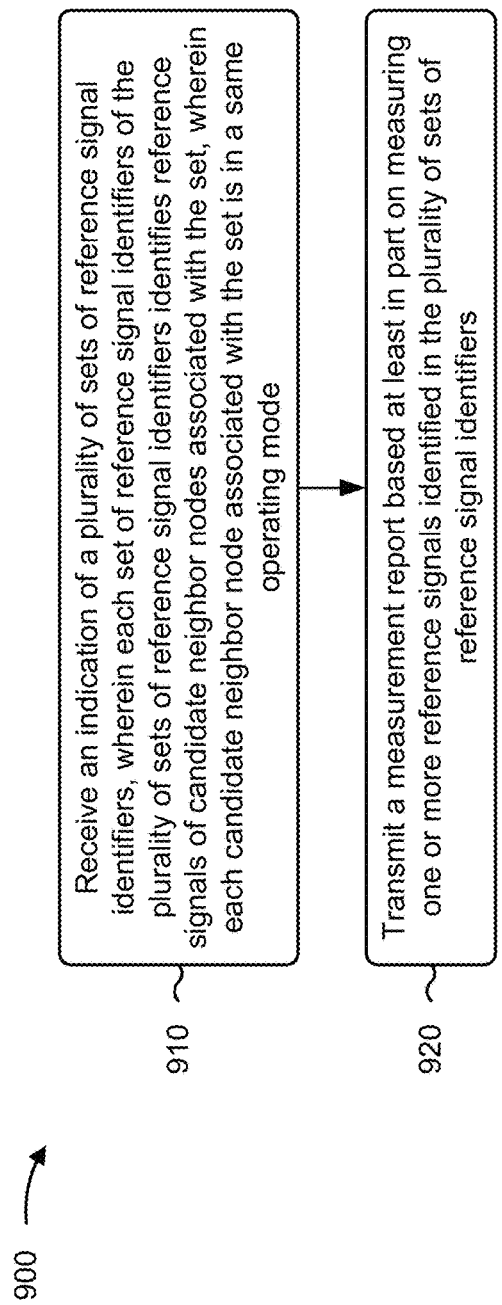
FIGS. 9-11 are diagrams illustrating example processes associated with power-saving mode based selection of a target node, in accordance with various aspects of the present disclosure.

FIG. 9 is a diagram illustrating an example process 900 performed, for example, by a child node, in accordance with various aspects of the present disclosure. Example process 900 is an example where the child node (e.g., an IAB node 410, a child node 505, a child node 705, a UE 120, a base station 110, and/or the like) performs operations associated with power-saving mode based selection of a target node.

As shown in FIG. 9, in some aspects, process 900 may include receiving an indication of a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode (block 910). For example, the child node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may receive an indication of a plurality of sets of reference signal identifiers, as described above. In some aspects, each set of reference signal identifiers of the plurality of sets of reference signal identifiers identifies reference signals of candidate neighbor nodes associated with the set. In some aspects, each candidate neighbor node associated with the set is in a same operating mode.

As further shown in FIG. 9, in some aspects, process 900 may include transmitting a measurement report based at least in part on measuring one or more reference signals identified in the plurality of sets of reference signal identifiers (block 920). For example, the child node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/ or the like) may transmit a measurement report based at least in part on measuring one or more reference signals identified in the plurality of sets of reference signal identifiers, as described above.

Process 900 may include additional aspects, such as any single aspect or any combination of aspects described below and/or in connection with one or more other processes described elsewhere herein.

In a first aspect, the plurality of sets of reference signal identifiers include a first set of reference signal identifiers associated with candidate neighbor nodes in an active mode and a second set of reference signal identifiers associated with candidate neighbor nodes in a power-saving mode.

In a second aspect, alone or in combination with the first aspect, process 900 includes receiving, from a control node, a first configuration associated with the first set of reference signal identifiers and a second configuration associated with the second set of reference signal identifiers.

In a third aspect, alone or in combination with one or more of the first and second aspects, transmitting the measurement report comprises transmitting a measurement report including measurements of reference signals identified in the first set of reference signal identifiers based at least in part on the first configuration, and transmitting a measurement report including measurements of reference signals identified in the second set of reference signal identifiers based at least in part on the second configuration.

In a fourth aspect, alone or in combination with one or more of the first through third aspects, the first configuration includes a first measurement configuration and a first reporting configuration, and the second configuration includes a second measurement configuration and a second reporting configuration.

In a fifth aspect, alone or in combination with one or more of the first through fourth aspects, transmitting a measurement report including a measurement value of a reference signal identified in the second set of reference signal identifiers is based at least in part on one or more measurement values of reference signals identified in the first set of reference signal identifiers or one or more other sets of reference signal identifiers.

In a sixth aspect, alone or in combination with one or more of the first through fifth aspects, transmitting the measurement report comprises determining that a measurement value of a reference signal identified in the second set of reference signal identifiers exceeds measurement values for each measured reference signal associated with the first set of reference signal identifiers by a threshold amount, and transmitting the measurement report including the measurement value of the reference signal identified in the second set of reference signal identifiers based at least in part on determining that the measurement value exceeds measurement values for each measured reference signal associated with the first set of reference signal identifiers by the threshold amount.

In a seventh aspect, alone or in combination with one or more of the first through sixth aspects, process 900 includes receiving an update to the plurality of sets of reference signal identifiers based at least in part on a determination that one or more candidate neighbor nodes has changed operating modes.

In an eighth aspect, alone or in combination with one or more of the first through seventh aspects, process 900 includes transmitting a second measurement report based at least in part on measuring one or more reference signals identified in the update to the plurality of sets of reference signal identifiers.

In a ninth aspect, alone or in combination with one or more of the first through eighth aspects, process 900 includes receiving, from a control node, an indication of a transmission schedule for a candidate neighbor node indicating a schedule of transmissions of reference signals associated with the candidate neighbor node, wherein measuring one or more reference signals identified in the plurality of sets of reference signal identifiers associated with the candidate neighbor node is based at least in part on receiving the indication of the transmission schedule for the candidate neighbor node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
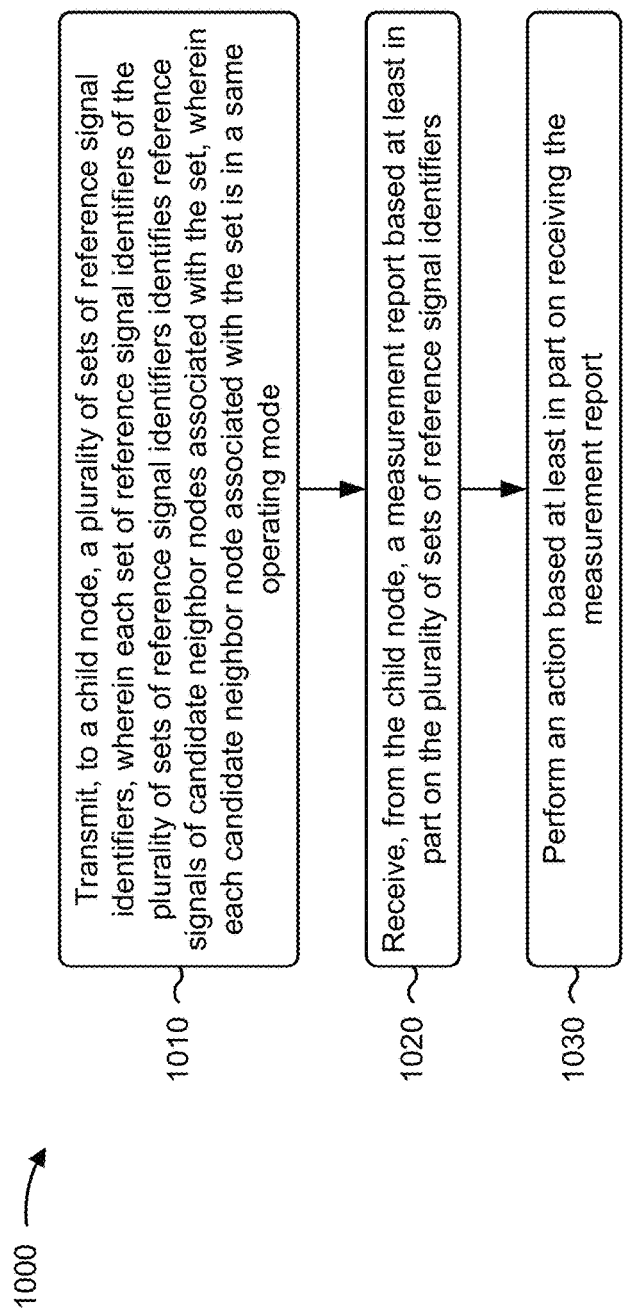

FIG. 10 is a diagram illustrating an example process 1000 performed, for example, by a control node, in accordance with various aspects of the present disclosure. Example process 1000 is an example where the control node (e.g., an IAB donor 405, an IAB node 410, a serving node 510, a control node 520, a serving node 605, a control node 710, a base station 110, and/or the like) performs operations associated with power-saving mode based selection of a target node.

As shown in FIG. 10, in some aspects, process 1000 may include transmitting, to a child node, a plurality of sets of reference signal identifiers, wherein each set of reference signal identifiers of the plurality of sets of reference signal identifiers identifies reference signals of candidate neighbor nodes associated with the set, wherein each candidate neighbor node associated with the set is in a same operating mode (block 1010). For example, the control node (e.g., using antenna 234, DEMOD 232, MIMO detector 236, receive processor 238, controller/processor 240, memory 242, communication unit 294, controller/processor 290, memory 292, and/or the like) may transmit, to a child node, a plurality of sets of reference signal identifiers, as described above. In some aspects, each set of reference signal identifiers of the plurality of sets of reference signal identifiers identifies reference signals of candidate neighbor nodes associated with the set. In some aspects, each candidate neighbor node associated with the set is in a same operating mode.

As further shown in FIG. 10, in some aspects, process 1000 may include receiving, from the child node, a measurement report based at least in part on the plurality of sets of reference signal identifiers (block 1020). For example, the control node (e.g., using antenna 234, DEMOD 232, MIMO detector 236, receive processor 238, controller/processor 240, memory 242, communication unit 294, controller/processor 290, memory 292, and/or the like) may receive, from the child node, a measurement report based at least in part on the plurality of sets of reference signal identifiers, as described above.

As further shown in FIG. 10, in some aspects, process 1000 may include performing an action based at least in part on receiving the measurement report (block 1030). For example, the control node (e.g., using antenna 234, DEMOD 232, MIMO detector 236, receive processor 238, controller/processor 240, memory 242, communication unit 294, controller/processor 290, memory 292, and/or the like) may perform an action based at least in part on receiving the measurement report, as described above.

Process 1000 may include additional aspects, such as any single aspect or any combination of aspects described below and/or in connection with one or more other processes described elsewhere herein.

In a first aspect, the control node is a serving node of the child node, a wireless node connected to the serving node and the candidate neighbor nodes, or a central unit.

In a second aspect, alone or in combination with the first aspect, the plurality of sets of reference signal identifiers include a first set of reference signal identifiers associated with candidate neighbor nodes in an active mode and a second set of reference signal identifiers associated with candidate neighbor nodes in a power-saving mode.

In a third aspect, alone or in combination with one or more of the first and second aspects, the action includes selecting a candidate neighbor node associated with a reference signal included in the measurement report as a target node for a handover procedure, or modifying an operating mode of one or more candidate neighbor nodes based at least in part on the measurement report.

In a fourth aspect, alone or in combination with one or more of the first through third aspects, modifying the operating mode of the candidate neighbor node comprises determining a current operating mode associated with the candidate neighbor node, and transmitting, to the candidate neighbor node, an indication causing the candidate neighbor node to modify the current operating mode of the candidate neighbor node based at least in part on the current operating mode and the measurement report.

In a fifth aspect, alone or in combination with one or more of the first through fourth aspects, modifying the operating mode of the candidate neighbor node causes the candidate neighbor node to modify at least one of a periodicity associated with the schedule, a transmit power associated with transmitting signals from the candidate neighbor node, a beam sweep configuration of the candidate neighbor node, an availability of one or more functions that the candidate neighbor node is capable of performing, or a combination thereof.

In a sixth aspect, alone or in combination with one or more of the first through fifth aspects, the action includes modifying an operating mode of a candidate neighbor node associated with a reference signal identified in the measurement report, and process 1000 includes receiving, from the child node, a second measurement report based at least in part on modifying the operating mode of the candidate neighbor node, and performing a second action based at least in part on receiving the second measurement report.

In a seventh aspect, alone or in combination with one or more of the first through sixth aspects, the second action includes selecting a candidate neighbor node associated with a reference signal identified in the second measurement report as a target node for a handover procedure, or modifying an operating mode of one or more candidate neighbor nodes based at least in part on the second measurement report.

In an eighth aspect, alone or in combination with one or more of the first through seventh aspects, the action includes selecting a candidate neighbor node associated with a reference signal identified in the measurement report as a target node for a handover procedure, and selecting the candidate neighbor node associated with the reference signal identified in the measurement report as the target node for a handover procedure is based at least in part on information associated with the child node, information associated with the candidate neighbor node, the measurement report, or a combination thereof.

In a ninth aspect, alone or in combination with one or more of the first through eighth aspects, the information associated with the child node includes a location of the child node, a trajectory of the child node, a service level requested by the child node, or a combination thereof.

In a tenth aspect, alone or in combination with one or more of the first through ninth aspects, the information associated with the candidate neighbor node includes an operating mode of the candidate neighbor node, an operating mode history of the candidate neighbor node, a power state of the candidate neighbor node, a cost parameter for selecting the candidate neighbor node, or a combination thereof.

In an eleventh aspect, alone or in combination with one or more of the first through tenth aspects, process 1000 includes determining an operating mode of a candidate neighbor node based at least in part on at least one of information associated with one or more child nodes, or information associated with a network in which the candidate neighbor node and the control node are located; and transmitting, to the candidate neighbor node, a configuration indicating the operating mode of the candidate neighbor node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
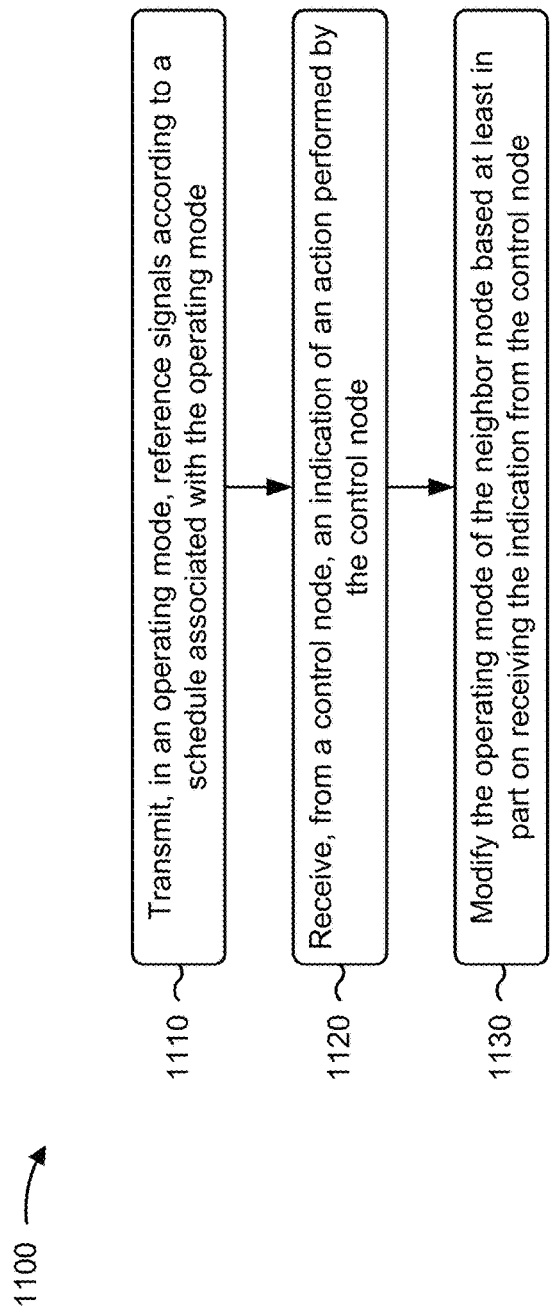

FIG. 11 is a diagram illustrating an example process 1100 performed, for example, by a neighbor node, in accordance with various aspects of the present disclosure. Example process 1100 is an example where the neighbor node (e.g., an IAB node 410, a target node 515, a neighbor node 610-630, a neighbor node 715, a base station 110, and/or the like) performs operations associated with power-saving mode based selection of a target node.

As shown in FIG. 11, in some aspects, process 1100 may include transmitting, in an operating mode, reference signals according to a schedule associated with the operating mode (block 1110). For example, the neighbor node (e.g., using antenna 234, DEMOD 232, MIMO detector 236, receive processor 238, controller/processor 240, memory 242, transmit processor 220, TX MIMO processor 230, MOD 232, and/or the like) may transmit, in an operating mode, reference signals according to a schedule associated with the operating mode, as described above.

As further shown in FIG. 11, in some aspects, process 1100 may include receiving, from a control node, an indication of an action performed by the control node (block 1120). For example, the neighbor node (e.g., using antenna 234, DEMOD 232, MIMO detector 236, receive processor 238, controller/processor 240, memory 242, transmit processor 220, TX MIMO processor 230, MOD 232, and/or the like) may receive, from a control node, an indication of an action performed by the control node, as described above.

As further shown in FIG. 11, in some aspects, process 1100 may include modifying the operating mode of the neighbor node based at least in part on receiving the indication from the control node (block 1130). For example, the neighbor node (e.g., using antenna 234, DEMOD 232, MIMO detector 236, receive processor 238, controller/processor 240, memory 242, transmit processor 220, TX MIMO processor 230, MOD 232, and/or the like) may modify the operating mode of the neighbor node based at least in part on receiving the indication from the control node, as described above.

Process 1100 may include additional aspects, such as any single aspect or any combination of aspects described below and/or in connection with one or more other processes described elsewhere herein.

In a first aspect, the operating mode includes: an active operating mode, or a power-saving operating mode.

In a second aspect, alone or in combination with the first aspect, the operating mode of the neighbor node is based at least in part on information associated with one or more child nodes.

In a third aspect, alone or in combination with one or more of the first and second aspects, process 1100 includes transmitting, to the control node, an indication of the schedule associated with the operating mode.

In a fourth aspect, alone or in combination with one or more of the first through third aspects, modifying the operating mode of the neighbor node includes at least one of modifying a periodicity associated with the schedule, modifying a transmit power associated with transmitting the reference signals, modifying a beam sweep configuration of the neighbor node, modifying an availability of one or more functions that the neighbor node is capable of performing, or a combination thereof.

In a fifth aspect, alone or in combination with one or more of the first through fourth aspects, the operating mode is a power-saving mode, the indication of the action performed by the control node indicates that the control node selected the neighbor node as a target node for a handover procedure, and modifying the operating mode of the neighbor node comprises changing the operating mode of the neighbor node to an active mode.

In a sixth aspect, alone or in combination with one or more of the first through fifth aspects, the indication of the action performed by the control node indicates a different operating mode for the neighbor node, and modifying the operating mode of the neighbor node comprises: modifying the operating mode of the neighbor node to the different operating mode, and transmitting reference signals according to a schedule associated with the different operating mode.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a child node, comprising:
    receiving an indication of a plurality of sets of reference signal identifiers, wherein each set of reference signal identifiers of the plurality of sets of reference signal identifiers identifies reference signals associated with candidate neighbor nodes associated with the set of reference signal identifiers, and wherein each candidate neighbor node associated with the set of reference signal identifiers is in a same operating mode;
    determining that a measurement value, of a reference signal of the reference signals, exceeds one or more measurement values, of one or more other reference signals of the reference signals, by a threshold amount; and
    transmitting a measurement report, including the measurement value of the reference signal, based at least in part on determining that the measurement value, of the reference signal, exceeds the one or more measurement values, of the one or more other reference signals, by the threshold amount.

2. The method of claim 1, wherein the plurality of sets of reference signal identifiers includes a first set of reference signal identifiers associated with one or more candidate neighbor nodes, of the candidate neighbor nodes, in an active mode and a second set of reference signal identifiers associated with one or more other candidate neighbor nodes, of the candidate neighbor nodes, in a power-saving mode.

3. The method of claim 2, further comprising:
receiving, from a control node, a first configuration associated with the first set of reference signal identifiers and a second configuration associated with the second set of reference signal identifiers.

4. The method of claim 3, wherein transmitting the measurement report comprises:
transmitting a first measurement report, including measurements of reference signals identified in the first set of reference signal identifiers, based at least in part on the first configuration; and
transmitting a second measurement report, including measurements of reference signals identified in the second set of reference signal identifiers, based at least in part on the second configuration.

5. The method of claim 3, wherein the first configuration includes a first measurement configuration and a first reporting configuration, and wherein the second configuration includes a second measurement configuration and a second reporting configuration.

6. The method of claim 2, wherein the reference signal is associated with a reference signal identifier of the second set of reference signal identifiers, wherein the measurement report includes the measurement value of the reference signal, and wherein the one or more measurement values of reference signals are identified in the first set of reference signal identifiers.

7. The method of claim 1, further comprising:
receiving an update to the plurality of sets of reference signal identifiers based at least in part on a determination that one or more candidate neighbor node, of the candidate neighbor nodes, have changed operating modes.

8. The method of claim 7, further comprising:
transmitting a second measurement report based at least in part on measuring one or more reference signals identified in the update to the plurality of sets of reference signal identifiers.

9. The method of claim 1, further comprising:
receiving, from a control node, an indication of a transmission schedule for a candidate neighbor node of the candidate neighbor nodes indicating a schedule of transmissions of reference signals associated with the candidate neighbor node,
wherein determining that the measurement value, of the reference signal, exceeds the one or more measurement values, of the one or more other reference signals, by the threshold amount is based at least in part on receiving the indication of the transmission schedule for the candidate neighbor node.

10. A method of wireless communication performed by a control node, comprising:
transmitting, to a child node, a plurality of sets of reference signal identifiers, wherein each set of reference signal identifiers of the plurality of sets of reference signal identifiers identifies reference signals associated with candidate neighbor nodes associated with the set of reference signal identifiers, and wherein each candidate neighbor node associated with the set of reference signal identifiers is in a same operating mode;
transmitting, to the child node, a reporting configuration for the plurality of sets of reference signals based at least in part on transmitting the plurality of sets of reference signal identifiers;
receiving, from the child node, a measurement report based at least in part on transmitting the reporting configuration, wherein the measurement report includes a measurement value of a reference signal, of the reference signals, exceeding one or more measurement values of one or more other reference signals, of the reference signals, by a threshold amount; and
selecting a candidate neighbor node, of the candidate neighbor nodes, associated with the reference signals as a target node for a handover procedure based at least in part on the measurement report.

11. The method of claim 10, wherein the control node is a serving node of the child node, a wireless node connected to the serving node and the candidate neighbor nodes, or a central unit.

12. The method of claim 10, wherein the plurality of sets of reference signal identifiers includes a first set of reference signal identifiers associated with one or more candidate neighbor nodes, of the candidate neighbor nodes, in an active mode and a second set of reference signal identifiers associated with one or more other candidate neighbor nodes, of the candidate neighbor nodes, in a power-saving mode.

13. The method of claim 10, further comprising:
modifying an operating mode of the candidate neighbor node based at least in part on the measurement report.

14. The method of claim 13, wherein modifying the operating mode of the candidate neighbor node comprises:
determining a current operating mode associated with the candidate neighbor node; and
transmitting, to the candidate neighbor node, an indication causing the candidate neighbor node to modify the current operating mode of the candidate neighbor node based at least in part on the current operating mode and the measurement report.

15. The method of claim 13, wherein modifying the operating mode of the candidate neighbor node causes the candidate neighbor node to modify at least one of: a periodicity associated with a schedule, a transmit power associated with transmitting signals from the candidate neighbor node, a beam sweep configuration of the candidate neighbor node, an availability of one or more functions that the candidate neighbor node is capable of performing, or a combination thereof.

16. The method of claim 13, further comprising:
receiving, from the child node, a second measurement report based at least in part on modifying the operating mode of the candidate neighbor node; and
performing a second action based at least in part on receiving the second measurement report.

17. The method of claim 16, wherein the second action includes:
selecting another candidate neighbor node, of the candidate neighbor nodes, as a target node for a handover procedure, or
modifying an operating mode of the other candidate neighbor nodes based at least in part on the second measurement report.

18. The method of claim 10, wherein the candidate neighbor nod is selected further based at least in part on:
information associated with the child node,
information associated with the candidate neighbor node, or
a combination thereof.

19. The method of claim 18, wherein the information associated with the child node includes:

a location of the child node,
a trajectory of the child node,
a service level requested by the child node, or
a combination thereof.

20. The method of claim 18, wherein the information associated with the candidate neighbor node includes:
an operating mode of the candidate neighbor node,
an operating mode history of the candidate neighbor node,
a power state of the candidate neighbor node,
a cost parameter for selecting the candidate neighbor node, or
a combination thereof.

21. The method of claim 10, further comprising:
determining an operating mode of the candidate neighbor node based at least in part on at least one of:
information associated with one or more child nodes, or
information associated with a network in which the candidate neighbor node and the control node are located; and
transmitting, to the candidate neighbor node, an operating mode configuration indicating the operating mode of the candidate neighbor node.

22. A method of wireless communication performed by a neighbor node, comprising:
transmitting, in an operating mode, reference signals according to a schedule associated with the operating mode;
receiving, from a control node, an indication of an action performed by the control node based at least in part on a measurement value, of a reference signal of the reference signals, exceeding one or more measurement values, of one or more other reference signals, by a threshold amount; and
modifying the operating mode of the neighbor node based at least in part on receiving the indication from the control node.

23. The method of claim 22, wherein the operating mode is a power-saving operating mode.

24. The method of claim 22, wherein the operating mode of the neighbor node is based at least in part on information associated with one or more child nodes.

25. The method of claim 22, further comprising: transmitting, to the control node, an indication of the schedule associated with the operating mode.

26. The method of claim 22, wherein modifying the operating mode of the neighbor node includes at least one of:
modifying a periodicity associated with the schedule,
modifying a transmit power associated with transmitting the reference signals,
modifying a beam sweep configuration of the neighbor node,
modifying an availability of one or more functions that the neighbor node is capable of performing, or a combination thereof.

27. The method of claim 23, wherein the indication of the action performed by the control node indicates that the control node selected the neighbor node as a target node for a handover procedure, and
wherein modifying the operating mode of the neighbor node comprises:
changing the operating mode of the neighbor node to an active mode.

28. The method of claim 22, wherein the indication of the action performed by the control node indicates a different operating mode for the neighbor node,
wherein modifying the operating mode of the neighbor node comprises:
modifying the operating mode of the neighbor node to the different operating mode; and
transmitting reference signals according to a schedule associated with the different operating mode.

29. A wireless node for wireless communication, comprising: a memory; and
one or more processors coupled to the memory, the one or more processors configured to:
receive an indication of a plurality of sets of reference signal identifiers, wherein each set of reference signal identifiers of the plurality of sets of reference signal identifiers identifies reference signals associated with candidate neighbor nodes associated with the set of reference signal identifiers, wherein each candidate neighbor node associated with the set of reference signal identifiers is in a same operating mode;
determine that a measurement value, of a reference signal of the reference signals, exceeds one or more measurement values, of one or more other reference signals of the reference signals, by a threshold amount; and
transmit a measurement report, including the measurement value of the reference signal, based at least in part on determining that the measurement value, of the reference signal, exceeds the one or more measurement values, of the one or more other reference signals, by the threshold amount.

30. The wireless node of claim 29, wherein the plurality of sets of reference signal identifiers includes a first set of reference signal identifiers associated with one or more candidate neighbor nodes, of the candidate neighbor nodes, in an active mode and a second set of reference signal identifiers associated with one or more other candidate neighbor nodes, of the candidate neighbor nodes, in a power-saving mode.

31. The wireless node of claim 29, wherein the one or more processors are configured to:
receive, from a control node, a first configuration associated with the first set of reference signal identifiers and a second configuration associated with the second set of reference signal identifiers.

32. The wireless node of claim 31, wherein the one or more processors are configured to:
transmit a first measurement report, including measurements of reference signals identified in the first set of reference signal identifiers, based at least in part on the first configuration; and
transmit a second measurement report, including measurements of reference signals identified in the second set of reference signal identifiers, based at least in part on the second configuration.

33. The wireless node of claim 31, wherein the first configuration includes a first measurement configuration and a first reporting configuration, and wherein the second configuration includes a second measurement configuration and a second reporting configuration.

34. The wireless node of claim 30, wherein the reference signal is associated with a reference signal identifier of the second set of reference signal identifiers, wherein the measurement report includes the measurement value of the reference signal, and wherein the one or more measurement values of reference signals are identified in the first set of reference signal identifiers.

35. The wireless node of claim 29, wherein the one or more processors are configured to:
receive an update to the plurality of sets of reference signal identifiers based at least in part on a determination that one or more candidate neighbor nodes, of the candidate neighbor nodes, have changed operating modes.

36. The wireless node of claim 35, wherein the one or more processors are configured to:
transmit a second measurement report based at least in part on measuring one or more reference signals identified in the update to the plurality of sets of reference signal identifiers.

37. The wireless node of claim 29, wherein the one or more processors are configured to:
receive, from a control node, an indication of a transmission schedule for a candidate neighbor node of the candidate neighbor nodes indicating a schedule of transmissions of reference signals associated with the candidate neighbor node,
wherein determining that the measurement value, of the reference signal, exceeds the one or more measurement values, of the one or more other reference signals, by the threshold amount is based at least in part on receiving the indication of the transmission schedule for the candidate neighbor node.

38. A control node for wireless communication, comprising:
a memory; and
one or more processors coupled to the memory, the one or more processors configured to:
transmit, to a child node, a plurality of sets of reference signal identifiers, wherein each set of reference signal identifiers of the plurality of sets of reference signal identifiers identifies reference signals associated with candidate neighbor nodes associated with the set of reference signal identifiers, and wherein each candidate neighbor node associated with the set of reference signal identifiers is in a same operating mode;
transmit, to the child node, a reporting configuration for the plurality of sets of reference signals based at least in part on transmitting the plurality of sets of reference signal identifiers;
receive, from the child node, a measurement report based at least in part on transmitting the reporting configuration, wherein the measurement report includes a measurement value of a reference signal, of the reference signals, exceeding one or more measurement values of one or more other reference signals, of the reference signals, by a threshold amount; and
select a candidate neighbor node, of the candidate neighbor nodes, associated with the reference signals as a target node for a handover procedure based at least in part on the measurement report.

39. The control node for wireless communication of claim 38, wherein the control node comprises a serving node of the child node, a wireless node connected to the serving node and the candidate neighbor nodes, or a central unit.

40. The control node for wireless communication of claim 38, wherein the plurality of sets of reference signal identifiers includes a first set of reference signal identifiers associated with one or more candidate neighbor nodes, of the candidate neighbor nodes, in an active mode and a second set of reference signal identifiers associated with one or more other candidate neighbor nodes, of the candidate neighbor nodes, in a power-saving mode.

41. The control node for wireless communication of claim 38, wherein the one or more processors are configured to:
modify an operating mode of the candidate neighbor node based at least in part on the measurement report.

42. The control node for wireless communication of claim 41, wherein the one or more processors are configured to:
determine a current operating mode associated with the candidate neighbor node; and
transmit, to the candidate neighbor node, an indication causing the candidate neighbor node to modify the current operating mode of the candidate neighbor node based at least in part on the current operating mode and the measurement report.

43. The control node for wireless communication of claim 41, wherein the operating mode of the candidate neighbor node is associated with at least one modification at the candidate neighbor node for:
a periodicity associated with a schedule,
a transmit power associated with transmitting signals from the candidate neighbor node,
a beam sweep configuration of the candidate neighbor node,
an availability of one or more functions that the candidate neighbor node is capable of performing, or
a combination thereof.

44. The control node for wireless communication of claim 41, wherein the one or more processors are configured to:
receive, from the child node, a second measurement report based at least in part on modifying the operating mode of the candidate neighbor node; and
perform a second action based at least in part on receiving the second measurement report.

45. The control node for wireless communication of claim 44, wherein the second action includes:
selecting another candidate neighbor node, of the candidate neighbor nodes, as a target node for a handover procedure, or modifying an operating mode of the other candidate neighbor nodes based at least in part on the second measurement report.

46. The control node for wireless communication of claim 38, wherein the one or more processors are configured to:
determine an operating mode of the candidate neighbor node based at least in part on at least one of:
information associated with one or more child nodes, or
information associated with a network in which the candidate neighbor node and
the control node are located; and
transmit, to the candidate neighbor node, an operating mode configuration indicating the operating mode of the candidate neighbor node.

47. A neighbor node for wireless communication comprising:
a memory; and
one or more processors coupled to the memory, the one or more processors configured to:
transmit, in an operating mode, reference signals according to a schedule associated with the operating mode;
receive, from a control node, an indication of an action performed by the control node based at least in part on a measurement value, of a reference signal of the reference signals, exceeding one or more measurement values, of one or more other reference signals, by a threshold amount; and
modify the operating mode of the neighbor node based at least in part on receiving the indication from the control node.

48. The neighbor node of claim 47, wherein the operating mode is a power- saving operating mode.

49. The neighbor node of claim 47, wherein the operating mode of the neighbor node is based at least in part on information associated with one or more child nodes.

50. The neighbor node of claim 47, further comprising:
transmitting, to the control node, an indication of the schedule associated with the operating mode.

51. The neighbor node of claim 47, wherein, to modify the operating mode of the neighbor node, the one or more processors are configured to modify at least one of:
a periodicity associated with the schedule,
a transmit power associated with transmitting the reference signals,
a beam sweep configuration of the neighbor node,
an availability of one or more functions that the neighbor node is capable of performing, or
a combination thereof.

52. The neighbor node of claim 48, wherein the indication of the action performed by the control node indicates that the control node selected the neighbor node as a target node for a handover procedure, and
wherein, to modify the operating mode of the neighbor node, the one or more processors are configured to:
change the operating mode of the neighbor node to an active mode.

53. The neighbor node of claim 47, wherein the indication of the action performed by the control node indicates a different operating mode for the neighbor node,
wherein, to modify the operating mode of the neighbor node, the one or more processors are configured to:
modify the operating mode of the neighbor node to the different operating mode; and
transmit reference signals according to a schedule associated with the different operating mode.

* * * * *